Oct. 6, 1964  R. K. WALTHER  3,151,881
TANDEM TRAILERS
Filed June 5, 1963
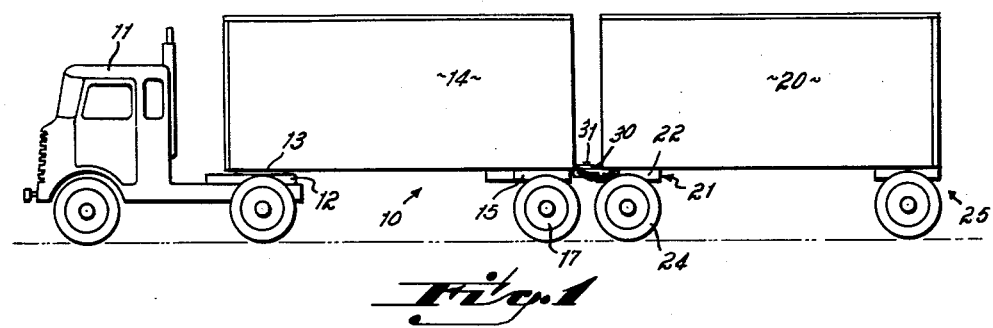
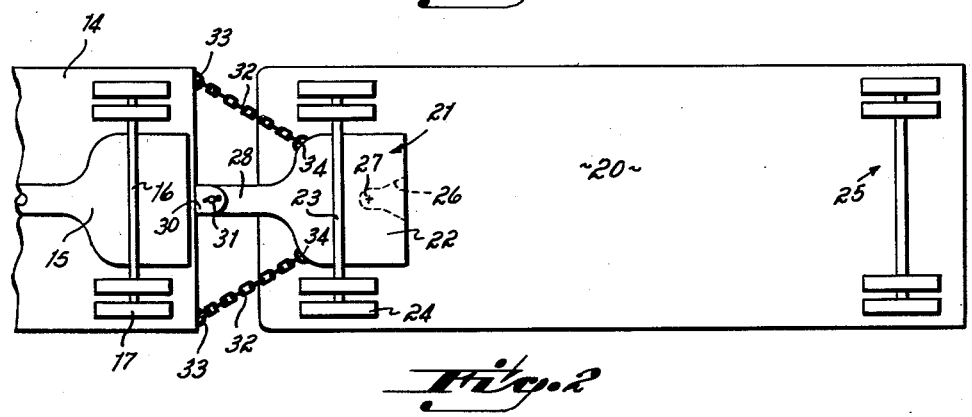
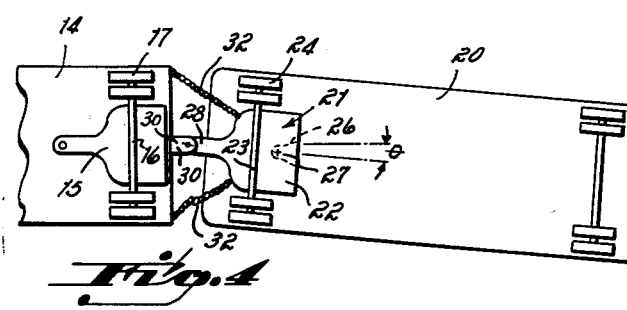
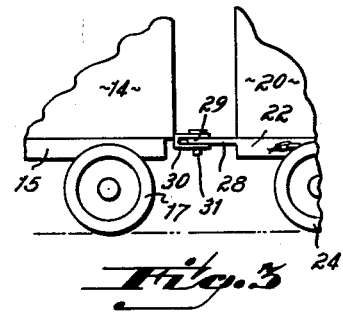
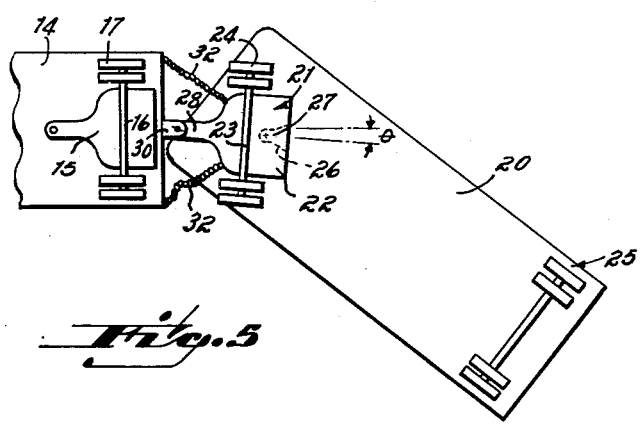
INVENTOR.
Roy K. Walther
BY Wood, Herron and Evans
ATTORNEYS United States Patent Office 3,151,881
Patented Oct. 6, 1964

3,151,881
TANDEM TRAILERS
Roy K. Walther, Fremont, Calif., assignor to Pullman Incorporated, Chicago, Ill., a corporation of Delaware
Filed June 5, 1963, Ser. No. 285,763
2 Claims. (Cl. 280—408)

This invention relates to tractor drawn trailer vehicles, and more particularly the invention is directed to apparatus for coupling two semi-trailers together.

The present invention relates to apparatus of the type disclosed in co-pending application, Serial No. 120,737, filed June 29, 1961 by James J. Black and being assigned to the same assignee. The invention of that application arose from the need to provide for the hauling of trailers in tandem, the trailers being separable and adapted to be hauled as separate units by respective tractors. That invention provides means for coupling trailers in tandem, the coupling means permitting an efficient and economical system of hauling trains of trailers over long distances while permitting the trailers to be conveniently separated for hauling as individual units at distribution points. That invention is in part directed to the problem of compliance with varying state laws as well as varying requirements within a state as to particular highways and secondary roads.

In accordance with that invention, the apparatus comprises two trailers each having a fixed rear suspension, the following trailer having an upper fifth wheel mounted on an articulator dolly, that is, a suspension having a lower fifth wheel. Means are provided for connecting the articulator dolly to the lead trailer in such a manner as to keep the forward axle of the following trailer substantially parallel to the rear axle of the lead trailer. Thus the combination of tractor and two trailers is interconnected by only two pivot points namely the pivot points at the respective forward ends of the two trailers where they engage the lower fifth wheels on the tractor and articulator dolly respectively. The double pivot point system minimizes the possibilities of jack knifing and permits the drawing of trailers in tandem in compliance with those state laws whch would prevent the interconnecting of tandem trailers by systems which would require three pivotal points.

The present invention employs the same principle as disclosed in the earlier application but embodies an improved structure. It has been an objective of the present invention to provide for a coupling between trailers which is more easily manipulated and more economical to produce. Further, it has been an objective to provide a coupling which can be used with an established fleet of trailers with only minor modifications in the trailers being required.

In accordance with the invention, the articulator dolly is provided with a single eye which is connectable to a single pintle hook located at the center of the rear end of a trailer. A pair of chains or similar flexible elements are attached to the rear corners of the lead trailer and to the dolly to permit only limited pivoting of the dolly, thereby maintaining the adjacent axles of the lead and following trailers substantially parallel.

The use of the chains to maintain parallelism of the axles admits of the possibility of leaving a slight amount of slack in each chain to permit pivoting of the articulator dolly with respect to the lead trailer within narrow limits. The small amount of permitted pivotal movement reduces in great measure the tire scuffing which would occur when the articulator dolly is rigid with respect to the lead trailer.

The several features of the invention will become more readily apparent from the following detailed description taken in conjunction with the accompanying drawings in which:

FIG. 1 is a side elevational view of a trailer connected in tandem in accordance with the present invention.

FIG. 2 is a bottom plan view of that portion of the trailer of FIG. 1 between the lead nad following trailer.

FIG. 3 is a fragmentary side elevational view of the pivotal connection of the articulator dolly to the lead trailer, and FIGS. 4 and 5 are diagrammatic bottom plan views illustrating the operation of the invention.

Referring to the drawings, a tandem trailer, connected in accordance with the invention, is illustrated at 10 in FIG. 1. There, a tractor 11 has a lower fifth wheel 12 by which it is connected to an upper fifth wheel 13 on a lead trailer 14. The lower and upper fifth wheels 12 and 13 respectively form a pivotal support for the forward end of the lead trailer 14.

The reaward end of the trailer 14 has a suspension 15 including an axle 16 which supports road engaging wheels 17 having tires. The suspension 15 may be fixed to the cargo body or may be in the form of a removable articulator dolly of the present invention. As set forth in the earlier application referred to above, a trailer can be formed by a cargo body having forward and rearward upper fifth wheels, the forward fifth wheel being engageable with a lower fifth wheel in the usual manner and the rearward upper fifth wheel being engageable with an articulator dolly which is fixed to the cargo body to block rotation about a vertical axis formed by the king pin. That type of construction is applicable to the present invention.

The following trailer indicated at 20 has at its forward end an upper fifth wheel including a king pin which rests on an articulator dolly 21. The articulator dolly has a lower fifth wheel 22 adapted to receive the upper fifth wheel of the trailer 20 for pivotal movement with respect to the king pin of the upper fifth wheel. The articulator also includes a spring mounted axle 23 which supports road engaging wheels 24 having tires. The rearward end of the trailer 20 is mounted on a suspension 25 which may be a removable articulator dolly of the type described above or may be a fixed suspension of known design.

Referring to FIGS. 2 and 3, the articulator dolly 21 is illustrated as having a lower fifth wheel portion 22 which is slotted as at 26 to receive the king pin of the upper fifth wheel of trailer 20 to support the forward end of the trailer 20 for pivotal movement about an axis 27.

Projecting from the forward end of the articulator dolly 21 is a tongue 28 which terminates in an eye 29. The rearward end of the lead trailer 14 has a pintle hook 30 which receives the eye 29 and holds it in position by means of a pintle 31. Other comparable pivotal connections are obviously within the scope of the invention.

A pair of chains 32 are connected at their forward ends 33 to the trailing corners of the lead trailer 14. At their other ends 34 the chains are connected to the articulator dolly 21. Preferably, when the axles of the suspension 15 and the articulator dolly 21 are parallel, each chain 31 will have the same predetermined amount of slack in it which will permit limited pivotal movement of the articulator dolly about the pivot point formed by the pintle 30. That pivotal movement is illustrated in FIG. 4 and the angular distance of movement is indicated as the angle $\theta$. The magnitude of the angle $\theta$ may be varied depending on the desires and requirements of the operator. Some state laws may preclude any pivotal movement between the articulator dolly 21 and the lead trailer and $\theta$ will, in that case, have to be zero, that condition being obtained by the elimination of any slack in the chains 31. It is preferred however to permit a small amount of pivotal movement between the articulator dolly and the lead trailer in order to minimize the tire scuffing which occurs when two longitudinally spaced axles are rigid with respect to each other. On sharp curves and in turning corners, such rigidly joined axles will cause the tires which they support to scuff sideways on the road surface and thereby impart unusual wear to the tires.

As illustrated in FIG. 5, while the articulator dolly 21 is permitted only limited pivotal movement with respect to the lead trailer, the pivotal connection of the trailer 20 to the articulator dolly, by means of the cooperative fifth wheels, permits complete pivotal movement of the trailer 20 about the axis 27 of the fifth wheel. Preferably the articulator dolly 21 spaces the following trailer 20 from the lead trailer 14 at a distance sufficient to permit the corners of the following trailer to swing past the rear surface of the lead trailer when the following trailer 20 pivots about the axis 26.

I claim:
1. Roadway transportation apparatus comprising,
a tractor having a lower fifth wheel,
a lead trailer having a fixed rear wheeled suspension and a forward upper fifth wheel and king pin in engagement with said tractor fifth wheel,
a following trailer having a fixed rear wheeled suspension and a forward upper fifth wheel and king pin,
an articulator dolly having a lower fifth wheel in engagement with the upper fifth wheel of said following trailer,
a tongue projecting from said lower fifth wheel and pivotally connected to said lead trailer, and
a pair of laterally spaced tension elements connected to said articulator dolly and to laterally spaced points on said lead trailer.

2. Roadway transportation apparatus comprising,
a tractor having a lower fifth wheel,
a lead trailer having a fixed rear wheeled suspension and a forward upper fifth wheel and king pin in engagement with said tractor fifth wheel,
a following trailer having a fixed rear wheeled suspension and a forward upper fifth wheel and king pin,
an articulator dolly having a lower fifth wheel in engagement with the upper fifth wheel of said following trailer,
a tongue projecting from said lower fifth wheel and pivotally connected to said lead trailer,
a pair of laterally spaced chains connected to said articulator dolly and to laterally spaced points on said lead trailer, and
each of said chains having only sufficient slack to permit limited pivotal movement of said articulator dolly with respect to said lead trailer.

References Cited in the file of this patent
UNITED STATES PATENTS

| | | |
|---|---|---|
| 1,211,825 | Curl | Jan. 9, 1917 |
| 2,252,135 | Oyler | Aug. 12, 1941 |
| 2,816,776 | Nimtz | Dec. 17, 1957 |
| 2,852,273 | Hudson | Sept. 16, 1958 |
| 3,066,953 | Chosy | Dec. 4, 1962 |
| 3,101,959 | Adams | Aug. 27, 1963 |